United States Patent
Murabayashi

(10) Patent No.: US 7,976,996 B2
(45) Date of Patent: Jul. 12, 2011

(54) FUEL CELL SYSTEM

(75) Inventor: Haruyasu Murabayashi, Otsu (JP)

(73) Assignee: Omron Corporation, Kyoto (JP)

( * ) Notice: Subject to any disclaimer, the term of this patent is extended or adjusted under 35 U.S.C. 154(b) by 305 days.

(21) Appl. No.: 12/000,564

(22) Filed: Dec. 13, 2007

(65) Prior Publication Data

US 2008/0152974 A1 Jun. 26, 2008

(30) Foreign Application Priority Data

Dec. 14, 2006 (JP) ................................ P2006-337188

(51) Int. Cl.
*H01M 8/04* (2006.01)
*H01M 16/00* (2006.01)

(52) U.S. Cl. ........ 429/430; 429/428; 429/429; 429/431; 429/432

(58) Field of Classification Search .................... 429/23, 429/429–432
See application file for complete search history.

(56) References Cited

U.S. PATENT DOCUMENTS

| 2002/0167784 A1* | 11/2002 | Takatomi et al. ............. 361/502 |
| 2003/0118876 A1* | 6/2003 | Sugiura et al. .................... 429/9 |
| 2004/0144579 A1* | 7/2004 | Hasuka et al. ............... 180/65.3 |
| 2004/0160229 A1 | 8/2004 | Fujita et al. |
| 2004/0217652 A1 | 11/2004 | Bitoh |
| 2006/0061922 A1 | 3/2006 | Mihai et al. |

FOREIGN PATENT DOCUMENTS

| EP | 1324456 A1 | 7/2003 |
| JP | 2001-068125 | 3/2001 |
| JP | 2002-034162 * | 1/2002 |
| JP | 2002-238164 | 8/2002 |
| JP | 2002-325378 | 11/2002 |
| JP | 2003-199332 | 7/2003 |
| JP | 2005-302489 | 10/2005 |
| JP | 2005-310435 | 11/2005 |
| WO | WO 02/097909 A1 | 12/2002 |
| WO | WO 2004/093288 A1 | 10/2004 |

* cited by examiner

*Primary Examiner* — Patrick Ryan
*Assistant Examiner* — Ladan Mohaddes
(74) *Attorney, Agent, or Firm* — Foley & Lardner LLP

(57) ABSTRACT

The fuel cell system includes a fuel cell; a power conditioner that converts a cell power supplied from the fuel cell to a power corresponding to a load; a capacitor to which an excessive output power of the fuel cell is charged at the time of a low load operation and from which a power corresponding to the insufficient output power of the fuel cell is discharged at the time of a high load operation; a voltage detection means for detecting a voltage of the capacitor; and a control means that determines the low load operation or the high load operation, calculates an output power from the fuel cell to maintain the excessive power generated at the time of the low load operation within a space capacity of the capacitor, and controls the output power of the fuel cell not to exceed the calculated value.

4 Claims, 8 Drawing Sheets

14

← VCmax

← VCmin

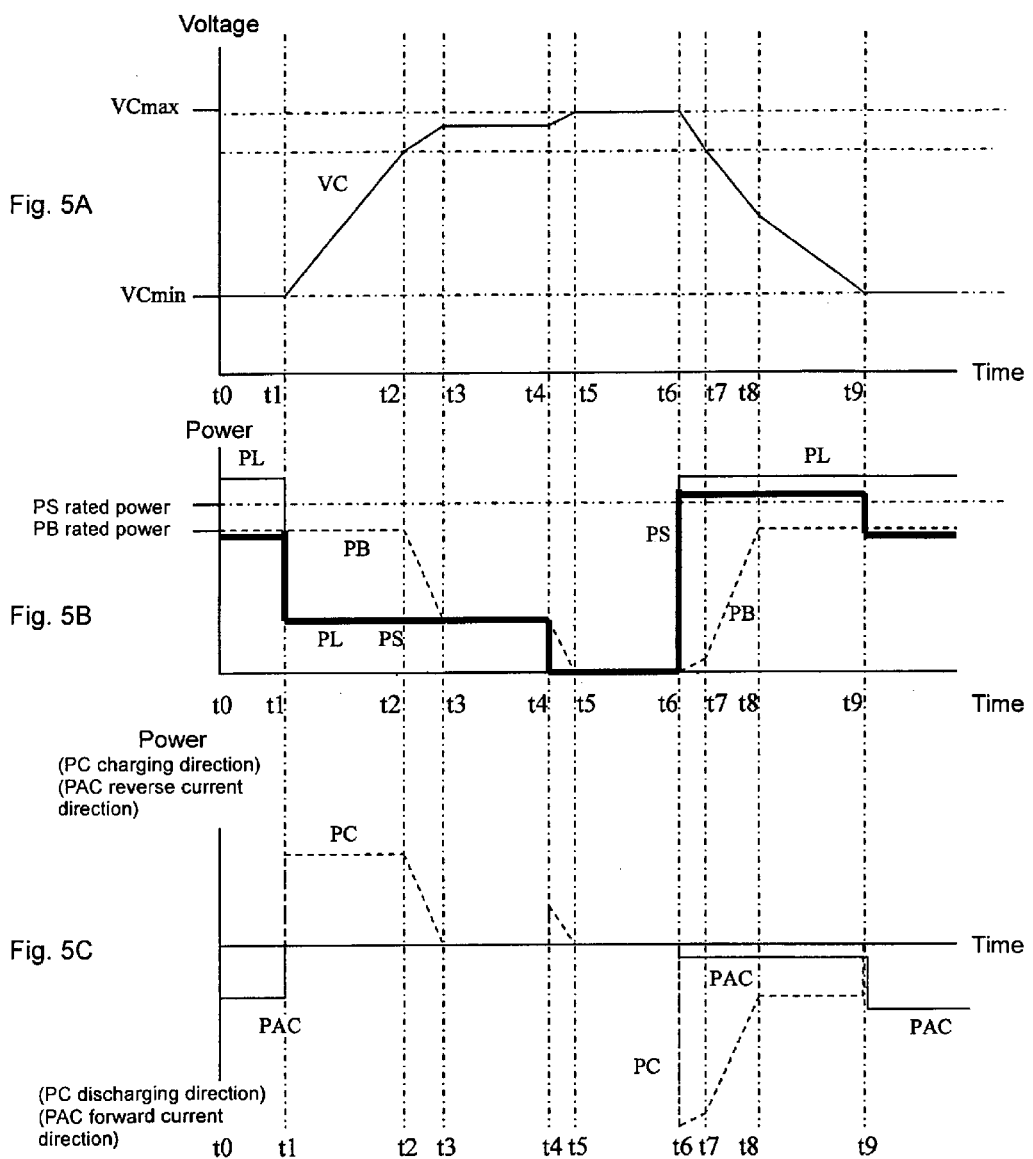
VC : Capacitor voltage
VC_max : Capacitor voltage upper limit value
Vcmin : Capacitor voltage lower limit value
PB : Output power of fuel cell
PS : Output power of power conditioner
PL : Load power
PC : Charging/discharging power of capacitor
PAC : System power

FUEL CELL SYSTEM

BACKGROUND OF THE INVENTION

This application claims priority from Japanese Patent Application P2006-337188, filed on Dec. 14, 2006. The entire contents of the aforementioned application is incorporated herein by reference.

1. Field of the Invention

The present invention relates to a household fuel cell system using a fuel cell. The fuel cell is provided with not a structure in which hydrogen and oxygen are directly burned, but a structure in which they are allowed to separately electrochemically react in a fuel electrode and an air electrode separated by an electrolyte, so that electricity is generated by taking out electrons to an external circuit.

2. Description of the Related Art

With respect to the fuel cell system, such a system has been proposed in which the fuel cell output is made coincident with the load power (power consumed by a load) so as to prevent a current from reversely flowing into the commercial power supply (refer to, for example, Japanese Patent Application Laid-Open No. 2001-068125). For example, this fuel cell system is provided with a fuel cell power supply used for supplying power of the fuel cell, a power conversion means that converts a fuel cell power to an electric power corresponding to a load so as to output the converted power to the load, and a control means that controls the fuel cell power supply and the power conversion means. The fuel cell power supply is provided with a reforming device that reforms a city gas into a hydrogen-rich fuel gas, and a fuel cell that generates electrical energy by using the supplied fuel gas. The power conversion means is constituted by, for example, a DC/DC converter that voltage-raises the fuel cell power and a power conditioner having an inverter used for converting the output of the DC/DC converter to an ac current. The control means is designed to control the fuel cell power supply and the power conversion means depending on the power consumption of the load.

This fuel cell system does not permit the fuel cell power to exceed a specified value and reversely flow into the commercial power supply, and in addition, the fuel cell power is not operative to follow a drastic variation in the load. For this reason, when the load is varied to a low level, an excessive power is generated due to a slow follow-up operation in following the variation. In order to prevent this excessive power from reversely flowing into the commercial power supply, such techniques have been proposed in which the excessive power is thermally converted by a heater to be consumed and a forward current is given from the commercial power-supply side to prevent the reversed current.

In this fuel cell system, however, because the rate of fuel cell power utilization is low due to a slow follow-up property to a drastic variation in the load, the installation rate of this system for practical use is low. Therefore, the applicant of the present invention has made extensive studies to improve the disadvantages of the conventional fuel cell system, and has consequently proposed a novel fuel cell system that can enhance the rate of fuel cell power utilization by installing therein a charging/discharging device, which, completely different from the conventional process for excessive power, allows the excessive fuel cell power to be charged in a capacitor, and upon insufficiency in the cell power, also allows the capacitor to discharge the accumulated power to compensate for the insufficient power.

In this newly developed fuel cell system, high response and high follow-up property to power variations of the capacitor and a capacitor such as a recently-developed electric double layer capacitor having a large capacity as high as a lead storage battery are utilized. For example, Japanese Patent Application Laid-Open No. 2003-199332 has disclosed such an energy storage device that utilizes the electric double layer capacitor.

In the fuel cell system in which the charging/discharging device utilizing a capacitor is assembled however, a problem arises in that, when a capacitor is over-charged to a level exceeding the capacitor withstand voltage (the upper limit value of capacitor voltage) or when a capacitor is over-discharged down to a capacitor discharge depth (the lower limit value of capacitor voltage) or less, the charging/discharging means might be damaged to deteriorate the capacitor.

Therefore, the fuel cell system of the present invention controls so that upon charging, the capacitor is allowed to have a space capacity so as not to exceed the capacitor withstand voltage and, upon discharging, the capacitor is prevented from discharging down to a voltage of the capacitor discharge depth or less. Thus, the fuel cell system enables to prevent the capacitor from deteriorating as well as positively preventing a reversed current from flowing into the commercial power supply, and also to improve the capacity operating rate of the fuel cell.

SUMMARY OF THE INVENTION

A fuel cell system including: a fuel cell; a power conditioner that converts a cell power supplied from the fuel cell to a power corresponding to a load, and outputs the converted power to the load; a capacitor to which an excessive output power of the fuel cell is charged at the time of a low load operation in which the load of the power conditioner has a lower power consumption than an output power of the fuel cell and from which a power corresponding to the insufficient output power of the fuel cell is discharged at the time of a high load operation in which the load of the power conditioner has a higher power consumption than the output power of the fuel cell; a voltage detection means for detecting a voltage of the capacitor; and a control means that determines whether the low load operation or the high load operation is being carried out, calculates based upon the power of the capacitor detected by the voltage detection means an output power from the fuel cell so as to be maintained within a range in which the excessive power generated at the time of the low load operation does not exceed a space capacity of the capacitor, and controls the output power of the fuel cell so as not to exceed the calculated value.

The relationship between the output power PB of the fuel cell and the voltage VC of the capacitor satisfies the following equation:

$$PB < \sqrt[t]{(T \times C \times (VCmax^2 - VC^2))}$$

where T: load response of the fuel cell,
C: capacity of the capacitor, and
VCmax: the upper limit value of the capacitor voltage.

More preferably, the control means is further provided with a function which, at the time of the high load operation, controls the output of the power conditioner so as not to allow the discharging voltage of the capacitor detected by the voltage detection means to reach a discharge depth or less.

In accordance with the fuel cell system of the present invention, an excessive power is charged to a capacitor, and upon insufficiency in the cell power, the accumulated power of the capacitor is discharged so as to compensate for the insufficient power. Thus, a superior follow-up property to load variations is provided and a self-sustaining operation is positively ensured without using a heater so that the rate of fuel cell power utilization is improved. As a result, the system is effectively suitable for use in a local place where no commercial power supply is available as well as for use as an emergency power supply at the time of commercial power supply service interruption.

Moreover, at the time of the low load operation, the output power of the fuel cell is limited in response to a voltage rise of the capacitor so that the excessive power can be positively charged to the capacitor by allowing the capacitor to have a space capacity for charging. Thus, the capacity operating rate of the fuel cell is improved, and the system enables to positively prevent a reversed current from flowing into the commercial power supply.

Furthermore, at the time of the low load operation, the output power of the fuel cell is limited in response to a voltage rise of the capacitor so that the system enables to prevent the capacitor from deteriorating and consequently to positively control the capacitor voltage to be maintained within an applicable range by limiting the charging voltage of the capacitor so as not to exceed the withstand voltage thereof, thereby making it possible to provide superior reliability. Since the output power PB of the fuel cell and the voltage VC of the capacitor are made to satisfy the above-mentioned relationship, the fuel cell is allowed to power-generate the highest possible output of the fuel cell so that the rate of generated-power utilization of the fuel cell is improved.

At the time of the high load operation, the output of the power conditioner is limited in response to a voltage drop of a capacitor so as not to allow the discharging voltage of the capacitor to reach a discharge depth or less, thereby making it possible to prevent the capacitor from deteriorating.

More preferably, in the fuel cell system of the present invention, the control means is further provided with functions which raise the output power of the fuel cell in response to a voltage drop of the capacitor detected by the voltage detection means, and also raise the output of the power conditioner in response to a voltage rise of the capacitor.

In accordance with this fuel cell system, since the output power of the fuel cell is raised in response to a voltage drop of the capacitor, the fuel cell is allowed to positively generate power when a space capacity is available in the capacitor so that the power is accumulated in the capacitor. In contrast, by raising the output of the power conditioner in response to a voltage rise of the capacitor, the power having been accumulated in the capacitor is positively discharged to the load. In this manner, when a space capacity is available in the capacitor, the accumulated power is positively discharged to the load to be utilized so that the power generating coefficient of the fuel cell is enhanced, and the fuel cell having a rated output smaller than the rated output of the power conditioner can be utilized.

According to the present invention, it becomes possible to provide a fuel cell system which has a superior follow-up property in response to variations in load, prevents the built-in capacitor from deteriorating, as well as positively preventing a reversed current from flowing into the commercial power supply, and improves the capacity operating rate of the fuel cell.

BRIEF DESCRIPTION OF THE DRAWINGS

FIGS. 5A-5C show time charts that indicates operations of the fuel cell system in accordance with the Embodiment of the present invention;

DETAILED DESCRIPTION OF THE PREFERRED EMBODIMENTS

Referring to drawings, the following description will discuss a fuel cell system in accordance with an Embodiment of the present invention. Here, although the power conversion between a charging/discharging device and a power conditioner (including built-in DC/DC converter and inverter) actually causes a loss, the loss is ignored for simplicity of explanation, and the explanation is given supposing that the input and output powers of the charging/discharging device are equal to each other (PIO=PC) and that the input and output powers of the power conditioner are also equal to each other (PO=PS).

Figure 1:
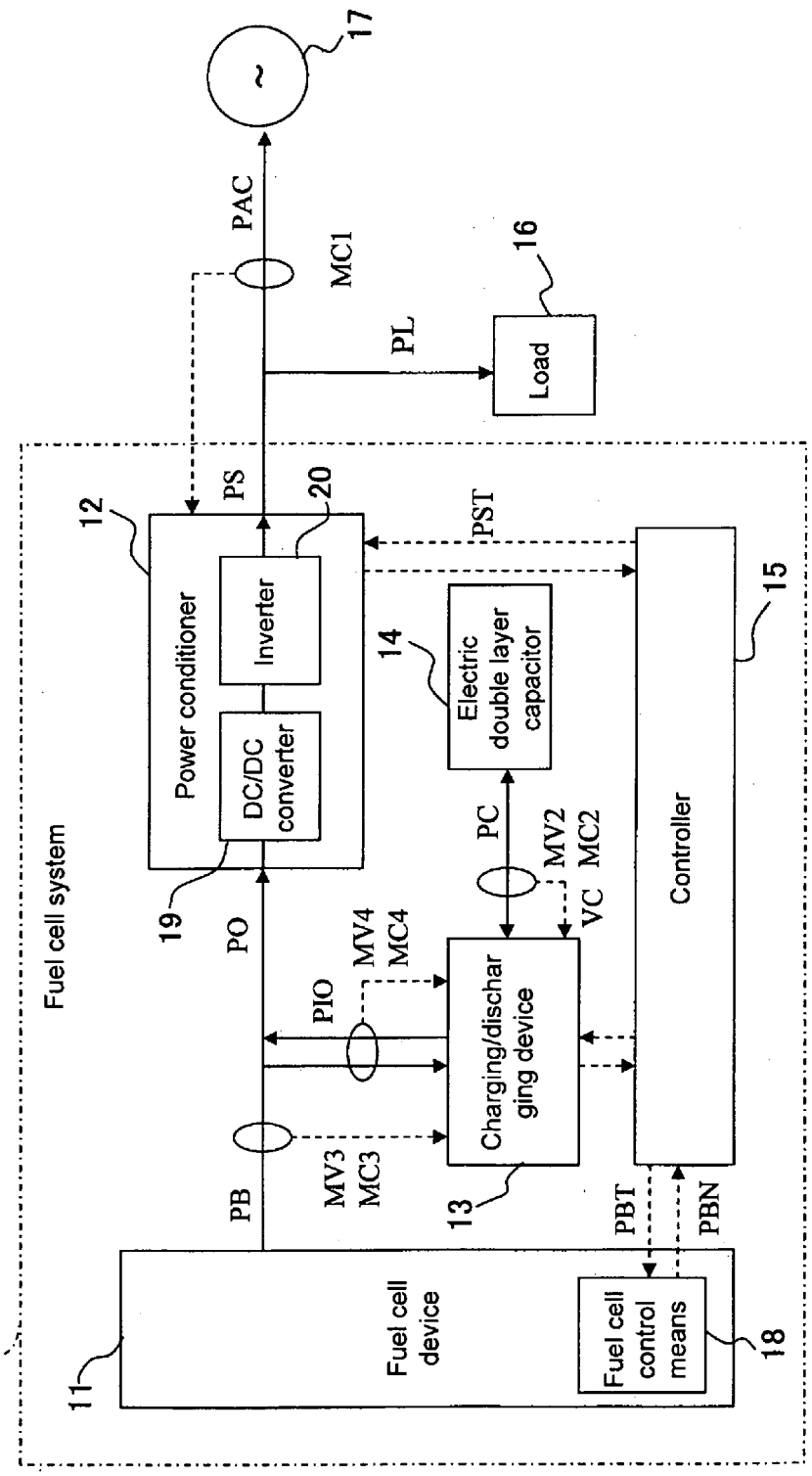
FIG. 1 shows a schematic block diagram of a fuel cell system in accordance with an Embodiment of the present invention.

FIG. 1 shows a schematic structure of a fuel cell system 10 including a fuel cell device 11, a power conditioner 12, a charging/discharging device 13, an electric double layer capacitor 14, a controller 15, a load 16 and a commercial power supply 17 (system).

The fuel cell device 11, which supplies a DC output (cell power) from the fuel cell, is provided with, for example, a reforming device that receives a gas supply of city gas from a gas pipe and reforms it a hydrogen-rich reformed gas, a carbon monoxide selective oxidizing unit that reduces carbon monoxide in the reformed gas to form a fuel gas, a fuel cell that receives supplies of the fuel gas and air to generate power through an electrochemical reaction, and a cell control means 18 that controls these devices to supply a dc output (cell power) through the power generation of the fuel cell. This gas may be prepared as any gas, as long as it is a hydrocarbon-based fuel, and, not limited to city gas, propane gas or the like may be used. The use of such a gas makes the fuel cell system suitable for installation and use in an ordinary home. The cell control means 18 may be formed by using a microcomputer. The microcomputer is allowed to communicate with a built-in microcomputer of the controller 15. The cell control means 18 receives an output power command value PBT for the fuel cell from the controller 15, and controls the reforming device so that a condition capable of outputting the target power is gradually achieved. At this time, the cell control means 18 outputs a currently possible output power to the controller 15 as a possible output power PBN of the fuel cell. Here the fuel cell device 11 may be controlled by the microcomputer of the controller 15 without providing the built-in microcomputer in the fuel cell device 11. The fuel cell device 11 has been discussed in detail, for example, in Japanese Patent Application Laid-Open No. 2005-310435, Japanese Patent Application Laid-Open No. 2005-302489 and Japanese Patent Application Laid-Open No. 2002-238164, and in the present specification, further descriptions will be omitted with respect to the fuel cell device 11.

The power conditioner 12 converts the cell power supplied from the fuel cell device 11 to an electric power corresponding to the load 16, and outputs the converted power. For example, in the case when a DC power is outputted from the fuel cell device 11, the power conditioner has a structure provided with a DC/DC converter 19 that raises this dc power to, for example, 140V, and an inverter 20 that converts the output of the DC/DC converter to an ac power of AC 100V having the same phase as that of the commercial power supply 17, and supplies the converted power to the load 16. The converting operation of the inverter 20 is controlled by the controller 15; however, this may be controlled by a control means (microcomputer) installed in the power conditioner 12. The controlling process of the power conditioner 12 is carried out so that the output power from the inverter 20 is made equal to the load power or less than that so as not to allow the power to be supplied to the commercial power supply 17, that is, so as not to allow a reversed current to flow into the commercial power supply 17 by detecting the reversed current by a MC 1. Here, the present embodiment has exemplified a structure in which the power conditioner 12 and the controller 15 belong to different blocks; however, the power conditioner 12 may have a block structure including the controller 15, and may be referred to as a power conditioner 12.

Figure 2:
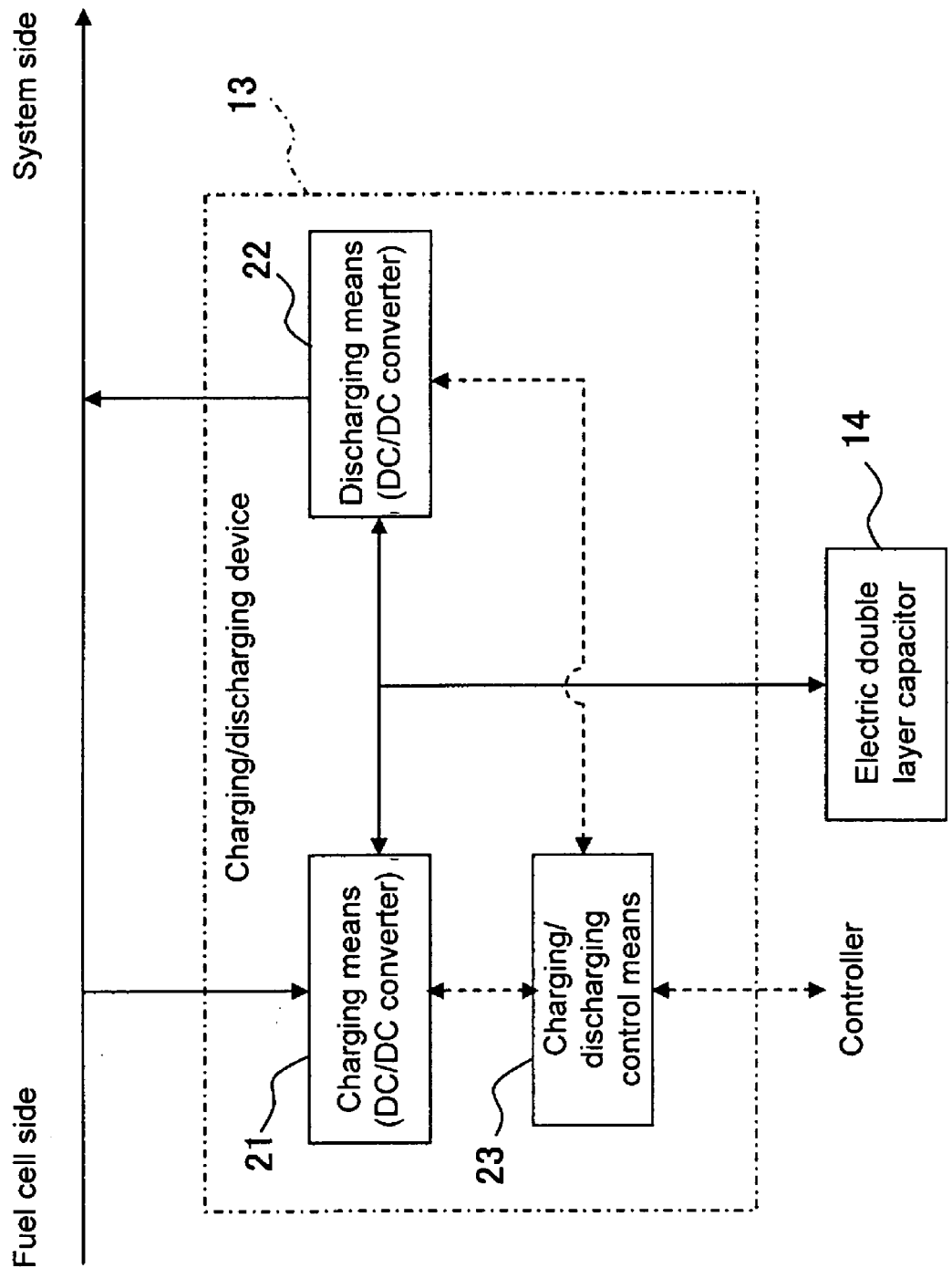
FIG. 2 shows a schematic block diagram of a charging/discharging device in accordance with the Embodiment of the present invention.

When an excessive cell power is obtained from the fuel cell device 11, the charging/discharging device 13 charges the excessive power to the electric double layer capacitor 14, while, when the cell power is insufficient, it discharges the charged power of the electric double layer capacitor 14 to the power conditioner 12 so as to compensate for all the portion or one portion of the insufficient power, and it is provided with a charging means (DC/DC converter) 21, a discharging means (DC/DC converter) 22 and a charging/discharging control means 23 (see FIG. 2).

The charging means 21 carries out a voltage-lowering process in which the cell power from the fuel cell device 11 is lowered so as to charge the electric double layer capacitor 14, and the charging means 22 allows the charged voltage of the electric double layer capacitor 14 to be discharged, and also carries out a voltage-raising process for raising the discharging voltage. The charging means 21 and the discharging means 22 may be configured by, for example, a switching element, a choke coil, a smoothing capacitor and the like.

The charging/discharging control means 23, which is formed by a microcomputer, controls operations of the charging means 21 and the discharging means 22 (as to which degree of voltage-lowering, voltage-raising, stop of voltage-lowering, or stop of voltage-raising operation to be carried out). The charging/discharging control means 23 is configured by, for example, a voltage-lowering control IC, a voltage-raising control IC, a switch element driving unit and a microcomputer or the like that controls these devices, and these IC and the like may be controlled by analog or digital signals. The charging/discharging control means 23 is designed to communicate with the microcomputer of the controller 15 so that the charging and discharging processes can be controlled. Here the charging/discharging device 13 may be controlled by the microcomputer in the controller 15 without forming a built-in computer in the charging/discharging device 13.

Figure 3A:
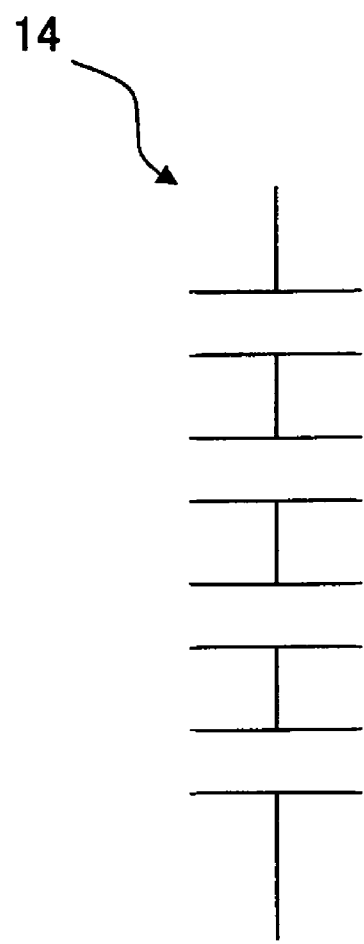
FIGS. 3A and 3B show explanatory drawings of an electric double layer capacitor in accordance with the Embodiment of the present invention.
Figure 3B:
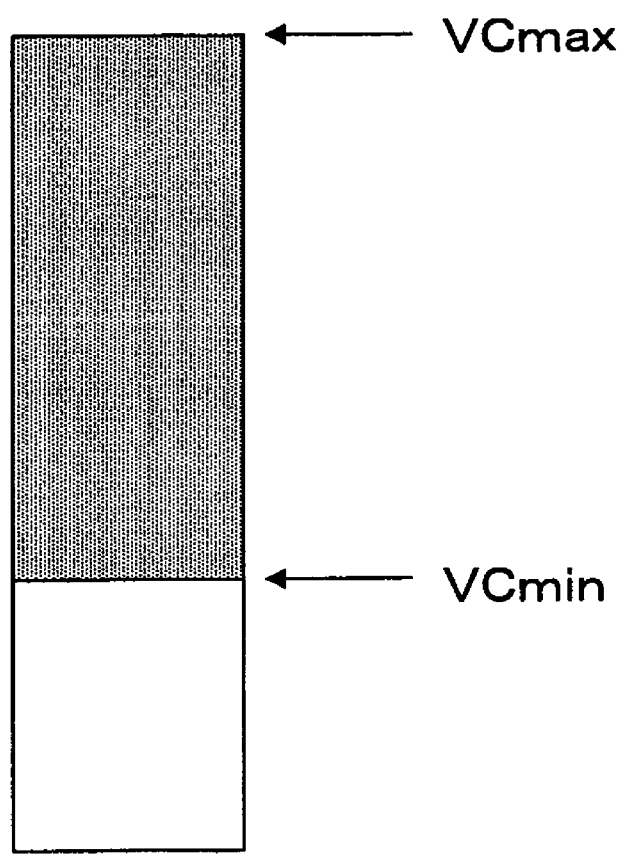

The capacitor may be prepared as a power-storing capacitor, and a capacitor having a large capacity with a short charging/discharging time, for example, an electric double layer capacitor 14 (see FIG. 3(A)), is preferably used. The electric double layer capacitor 14 is designed to be applicable within a range from a capacitor discharge depth (the lower limit value of capacitor voltage) of VCmin or more to a capacitor withstand voltage (the upper limit value of capacitor voltage) of VCmax or less (see FIG. 3(B)).

The controller 15, which is formed by a microcomputer, is designed to control the capacitor voltage so that, during the system driving, the electric double layer capacitor 14 is always charged with a charged voltage capable of dealing (charge/discharge dealing) with either of the charging operation of an excessive power and the discharging operation for compensating for all or one portion of the insufficient power. Although not shown in the drawings, the controller 15 is formed by a microcomputer composed of a memory, a CPU and the like, and stores in its memory or the like a table of a voltage range in which the electric double layer capacitor 14 is allowed to charge and discharge in response to the respective values of the cell power. This table includes the following set values, that is, the lower limit value VCmin of a capacitor voltage which, upon insufficiency in the cell power due to variation to a high load, the electric double layer capacitor 14 needs to discharge so as to compensate for the insufficient power, and the upper limit value VCmax of a capacitor voltage which, upon excessive cell power due to variation to a low load, the electric double layer capacitor 14 needs to charge the excessive power.

The following description will discuss controlling processes of the charging/discharging device 13 carried out by the controller 15. The controller 15 outputs a control command to the charging/discharging control means 23 of the charging/discharging device 13 so as to make the output power PB of the fuel cell equal to the possible output power PBN of the fuel cell. More specifically, the controller 15 calculates the output power PB of the fuel cell based upon the voltage and current detected by the voltage detection means MV3 and the current detection means MC3, and controls a charging/discharging current of the electric double layer capacitor 14 detected by the current detection means MC2 so as to make the output power PB equal to the possible output power PBN.

The following description will discuss output controlling processes of the fuel cell device 11 carried out by the controller 15.

i) When the voltage of the electric double layer capacitor 14 is high with a small space capacity, the output of the fuel cell device 11 is limited. More specifically, the controller 15 limits (reduces) the output power command value PBT of the fuel cell to be given to the cell control means 18 of the fuel cell device 11 in response to a voltage rise of the electric double layer capacitor 14 detected by the voltage detection means MV2.

At this time, the output PB of the fuel cell is restrained, with the result that, when the load 16 is high with the output power PS of the power conditioner being greater than the output power PB of the fuel cell, the discharging current of the charging/discharging power PIO increases to accelerate a discharging process of the capacitor (voltage drop). In contrast, in the case when the load 16 is low with the output power PS being smaller than the output power PB, since the output of the fuel cell is restrained, the charging current of the charging/discharging power PIO is also restrained. In this manner, by restraining the voltage rise or accelerating the voltage drop of the electric double layer capacitor 14, the space capacity can be ensured.

ii) When the voltage of the electric double layer capacitor 14 is low with a sufficient space capacity, the fuel cell device 11 is controlled so as to raise its output. More specifically, the controller 15 increases the output power command value PBT for the fuel cell to be given to the cell control means 18 of the fuel cell device 11 in response to a voltage drop of the electric double layer capacitor 14 detected by the voltage detection means MV2. At this time, the output PB of the fuel cell is increased so that the excessive power increases, with the result that the charging current of the charging/discharging power PIO increases so that power is accumulated in the space capacity. Moreover, even upon high load, since there is an increased output of the fuel cell, the power to be supplied from the fuel cell increases, making it possible to reduce the charging current from the capacitor.

By carrying out the above-mentioned process i), since the space capacity to which the excessive power is charged is ensured, such an excessive charge to the electric double layer capacitor 14 as to exceed the withstand voltage is prevented and such an unnecessary power drop as to deviate from the possible output power PBN of the fuel cell 11 is also prevented so that it becomes possible to prevent occurrence of a reversed current and consequently to improve the system reliability and prevent the energy loss.

By carrying out the above-mentioned process ii), a function is further provided by which, during the time in which a space capacity is available in the electric double layer capacitor 14, the output power PB of the fuel cell is raised to increase the capacity operating rate of the fuel cell device 11, thereby making it possible to apply a fuel cell device 11 with a low rating.

The following description will discuss the output control of the power conditioner 12 to be carried out by the controller 15.

iii) The controller 15 detects a voltage drop of the electric double layer capacitor 14 by using the voltage detection means MV2, and by limiting the output power PS of the power conditioner in response to the voltage drop of the electric double layer capacitor 14, the input power PO to be supplied to the power conditioner 12 is reduced, and the charging power from the electric double layer capacitor 14 is consequently suppressed so that the voltage drop of the electric double layer capacitor 14 is restrained. More specifically, when the voltage of the electric double layer capacitor 14, detected by the voltage detection means MV2, has reached the lower limit value VCmin, the controller 15 sets the output power command value PST of the power conditioner to such a value as to limit the possible output power PBN of the fuel cell so that the output of the power conditioner 12 is controlled. In other words, the possible output power of the power conditioner controls the output of the power conditioner 12 so as to be limited to the possible output power of the fuel cell or less.

iv) By increasing the output power PS of the power conditioner in response to the voltage rise of the electric double layer capacitor 14 detected by the voltage detection means MV2, the controller 15 increases the input power PO to be supplied to the power conditioner 12 so that power accumulated by the voltage rise of the electric double layer capacitor 14 can be reused. More specifically, when the voltage of the electric double layer capacitor 14 detected by the voltage detection means MV2 is greater than the lower limit value VCmin, the controller 15 sets the rated power of the power conditioner to the output power command value PST of the power conditioner, thereby controlling the output of the power conditioner 12.

v) In any of the processes of iii) and iv), the system current is detected by the current detection means MC1, and the output power command value PST for the power conditioner is consequently limited so as not to generate a reversed current toward the system so that the output of the power conditioner 12 is controlled. That is, the controlling process is executed to provide either of the smaller output between iii) or iv) and v).

By carrying out the above-mentioned processes iii) and v), the output power PS of the power conditioner PS<=the output power PB of the fuel cell is satisfied, and all the outputs of the power conditioner 12 are consequently prepared from the fuel cell device 11 so that the necessity of supplying power from the electric double layer capacitor 14 and the necessity of forcefully supplying power from the fuel cell device 11 can be eliminated; thus, it becomes possible to ensure the system reliability.

By carrying out the above-mentioned processes iv) and v), the output power PS of the power conditioner can be raised within such a range as not to exert a reversed current so that the power accumulated in the electric double layer capacitor 14 is readily reused, thereby making it possible to improve the rate of generated power utilization of the fuel cell device 11.

Referring to FIG. 4, the following description will discuss the relationship between the excessive power of the fuel cell device 11 and the space capacity of the electric double layer capacitor 14.

Figure 4A:
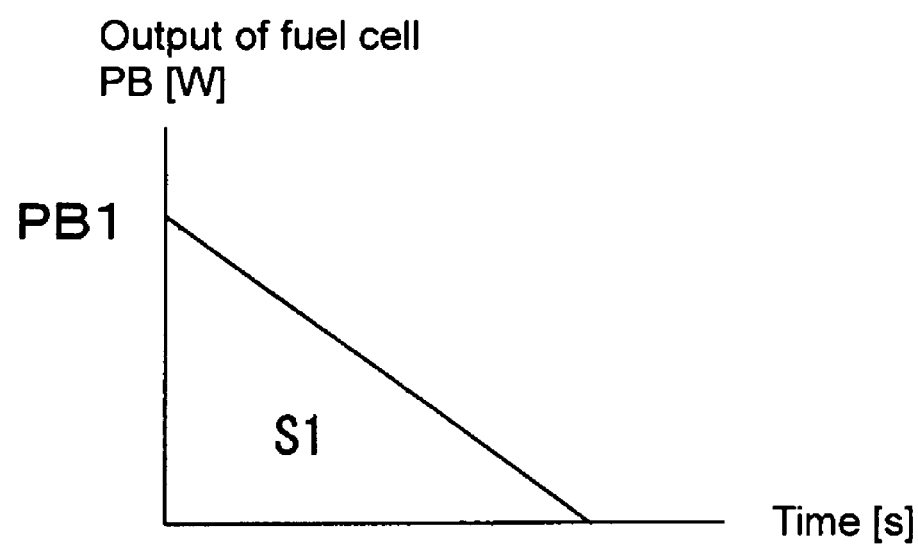
FIGS. 4A and 4B show explanatory drawings that indicates the relationship between the excessive power of the fuel cell device and the space capacity of the electric double layer capacitor in accordance with the Embodiment of the present invention.

In FIG. 4(A), the axis of ordinate indicates the output power PB (W) of the fuel cell and the axis of abscissa indicates the time (s), and the solid line of the drawing indicates the output power PB1 of the fuel cell that proceeds to reach zero. Here, the inclination—T [W/s] of the solid line represents the load response of the fuel cell.

The following equation (1) indicates the electric energy in the course of reducing the output power in the fuel cell down to zero, when the output power of the fuel cell is PB1, and this corresponds to the excessive power upon variation to a low load (corresponding to the area of S1 in the Figure).

$$\text{Excessive Power} = (1/2) \times (PB\ 1/2)/T\ [Ws] \tag{1}$$

Figure 4B:
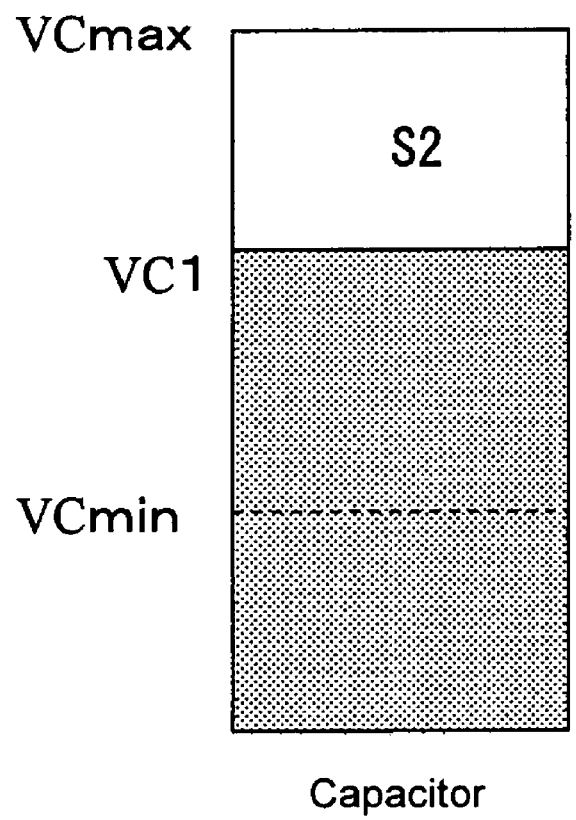

In FIG. 4(B), when the capacitor voltage is CV1, the electric energy (space capacity corresponding to portion S2 in the Figure) to be charged up to VCmax is indicated by the following equation (2):

$$\text{Space Capacity of Capacitor} = (1/2) \times C \times VC\max^2\ VC1^2) \\ [Ws] \tag{2}$$

where C: capacity of the capacitor with unit [F]

Here, an attempt is made to charge the excessive power shown in FIG. 4(A) into the space capacity portion in the capacitor as shown in FIG. 4(B), and since the charge is not allowed to exceed the upper limit value VCmax of the capacitor voltage, the space capacity needs to be made greater than the excessive power. That is, the following expression (3) is obtained from the relational expression Equation (2)>Equation (1).

$$PB1 < \sqrt{(T \times C \times (VC\max^2 - VC1^2)} \tag{3}$$

Consequently, when the capacitor voltage is VC1, the output voltage of the fuel cell should be made smaller than PB1 (here, suppose that the relationship between PB1 and VC1 satisfies Expression (3)). At this time, although the output power command value PBT is given to the fuel cell device 11 in response to the capacitor voltage, the response of the fuel cell is slow so that the command value is set by taking this fact into consideration. In the case when the capacitor voltage is VC1, even if the command value, derived from the following Equation (4), is given, a delay occurs.

$$PB1 = \sqrt{(T \times C \times (VCmax^2 - VC1^2)}$$ (4)

Therefore, a command value lower than the value derived from the following Equation (5) should be given.

$$\sqrt{(T \times C \times (VCmax^2 - VC1^2)}$$ (5)

Next, referring to a time chart in FIG. 5, the following description will discuss operations of the fuel cell system. In FIG. 5(A), the axis of ordinate indicates the voltage of the electric double layer capacitor 14, and the axis of abscissa indicates the time. In FIG. 5(B), the axis of ordinate indicates the power, and the axis of abscissa indicates the time, with the load power PL (solid line), the output power PB (broken line) of the fuel cell and the output power PS (bold line) of the power conditioner being respectively indicated thereon. In FIG. 5(C), the axis of ordinate indicates the power, and the axis of abscissa indicates the time, with the charging/discharging power PC (broken line) and the system power PAC (solid line) being respectively indicated thereon. Here, in the present example, an explanation will be given as a system that satisfies rated output of the power conditioner>rated output of the fuel cell.

(t0–t1)

The load power PL is kept greater than the output power PB of the fuel cell. In the present example, since the capacitor voltage VC detected by the voltage detection means MV2 is set to the lower limit value VCmin, the output power command value PST of the power conditioner is not set to the rated output of the power conditioner 12, but reduced to the possible output power PBN of the fuel cell, so as to control the output power PS of the power conditioner. Since the charging/discharging device 13 controls the output power PB of the fuel cell to be equal to the possible output power PBN, and since the output power PS of the power conditioner is controlled to be equal to the possible output power PBN, no charging power is generated from the electric double layer capacitor 14 so that the voltage drop of the electric double layer capacitor 14 is prevented.

(t1–t2)

When the load power PL becomes lower than the output power PB of the fuel cell at t1 due to a variation in load, a reversed current power of the system is detected by the current detection means MC1. The inverter is controlled so as to limit the output power PS of the power conditioner so that the reversed current is not allowed to flow toward the system side, and the output power PS of the power conditioner is consequently made equal to the load power PL. At this time, (PB−PL) corresponds to the excessive power.

The capacitor voltage VC is sufficiently low so that a sufficient space capacity is provided; therefore, the rated output value of the fuel cell is given to the fuel cell device 11 as the output power command value PBT so that the rated output value, as it is, is used as the possible output power PBN of the fuel cell. The charging/discharging device 13 charge/discharge-controls the electric double layer capacitor 14 so as to set the fuel cell to the rated output, in order to control the output power PB of the fuel cell to be equal to the possible output power PBN. Therefore, (PB−PL)(=PB−PS) forms the excessive power so that the controlling operation is carried out to charge this power to the electric double layer capacitor 14. As a result, the voltage of the electric double layer capacitor 14 is raised, while the space capacity of the electric double layer capacitor 14 is gradually reduced.

Additionally, during this period in which the space capacity of the electric double layer capacitor 14 is sufficient, with the load 16 being low, since the output power PB of the fuel cell is controlled to become the rated output so as to be maximized, the capacity operating rate of the fuel cell is raised to quickly charge the electric double layer capacitor 14 so as to prepare for compensating for an insufficient power caused when the load 16 is varied to a high load.

(t2–t3)

When the voltage of the electric double layer capacitor 14 rises to cause a reduction in the space capacity of the electric double layer capacitor 14, the output power PB of the fuel cell is limited in response to the voltage rise of the electric double layer capacitor 14. Thus, the excessive power to be generated upon variation to a low load is suppressed so that the excessive power can be charged without exceeding the space capacity of the electric double layer capacitor 14.

Since the output power PB of the fuel cell is limited in response to a voltage rise of the electric double layer capacitor 14, the power PC (=PB−PS) to be charged to the electric double layer capacitor 14 is reduced so that the voltage rise of the electric double layer capacitor 14 is suppressed so as not to exceed the upper limit value VCmax. With respect to this suppressing method, the output power of the fuel cell whose excessive power to be generated at the time of a low load 16 is allowed to compensate for the space capacity is calculated from the voltage of the electric double layer capacitor 14, and the output of the fuel cell is controlled so as not to exceed this output value. The output control of the fuel cell device 11 is carried out by giving an output power command value PBT for the fuel cell to the fuel cell control means 18 so that the fuel cell control means 18 controls the output based upon the command value.

Here, the output power PS of the power conditioner is successively controlled so as not to allow the current of the system detected by the current detection means MC1 to generate a reversed current, and kept in a balanced state with PL=PS.

(t3–t4)

At t3, the output power PB of the fuel cell forms a value corresponding to the capacitor voltage VC, with the output power PB of the fuel cell and the load power PL of the output power PB being well balanced, with the result that no charge is given to the electric double layer capacitor 14 so that the capacitor voltage VC becomes constant.

(t4–t5–t6)

When the load 16 becomes further lower, the same operations as those in the periods t2–t3–t4 are carried out. The output power PB of the fuel cell is further limited so as not to exceed the upper limit value VCmax of the electric double layer capacitor 14. Moreover, the output power PS of the power conditioner is controlled to PL=PS so as to prevent a system current detected by the current detection means MC1 from generating a reversed current.

(t6–t8)

In the case when the load 16 becomes higher due to a load variation at t6, since the output power PB of the fuel cell fails to follow the variation immediately, an insufficient power is caused (see PS−PB in FIG. 5(B)). At this time, the power, outputted by the fuel cell at the time of a low load operation, has been preliminarily accumulated in the electric double layer capacitor 14, and since the capacitor voltage VC is kept at the lower limit value VCmin or more, the output power PS of the power conditioner is set to the rated output power of the power conditioner 12, and the power conditioner 12 is thus controlled to immediately output the rated power. In this case, since the output power PS of the power conditioner fails to compensate for all the output power PB of the fuel cell to cause an insufficient power (PS−PB); however, the power preliminarily accumulated in the electric double layer capacitor 14 compensates for this portion (see FIG. 5(C)), with the result that the capacitor voltage VC is gradually reduced (see FIG. 5(A)). Since the space capacity increases as the capacitor voltage VC reduces, the fuel cell is controlled to increase the output power PB of the fuel cell correspondingly (to a level in which, even upon variation to a low load, the excessive power can be absorbed) (see PB in FIG. 5(B). The output control of the fuel cell device 11 is carried out by giving the output power command value PBT for the fuel cell to the fuel cell control means 18.

Here, in the present example, since the load power PL is greater than the output power PS of the power conditioner, the power (PL−PS) corresponding to its difference is supplied from the system.

(t8–t9)

At t8, the output power PB of the fuel cell is set to the rated output of the fuel cell, and made constant. Here, with respect to a portion of the output power PS of the power conditioner exceeding the rated value of the fuel cell (PS—fuel cell rated value), the charging/discharging device 13 discharge-controls the electric double layer capacitor 14 so that it compensates for the corresponding portion by the power preliminarily accumulated at the time of a low load operation.

(t9–)

At t9, the capacitor voltage VC reaches the lower limit value VCmin to limit the output power command value PST of the power conditioner to the possible output power PBN of the fuel cell, and the electric supply is no longer given from the electric double layer capacitor 14 so that the capacitor voltage VC is limited to the lower limit value VCmin.

In this manner, since power is accumulated in the capacitor at the time of a low load operation and since the accumulated power is utilized at the time of a high load operation, the rated output of the fuel cell can be made smaller than the rated output of the power conditioner so that the cost of the expensive fuel cell can be reduced. Moreover, since the output of the fuel cell can be smoothed, the rate of generated power utilization of the fuel cell is enhanced.

In the above-mentioned arrangement, a system that satisfies the rated output of the power conditioner>the rated output of the fuel cell has been exemplified; however, not limited by this arrangement, a system that satisfies the rated output of the power conditioner<=the rated output of the fuel cell may be used.

Figure 6:
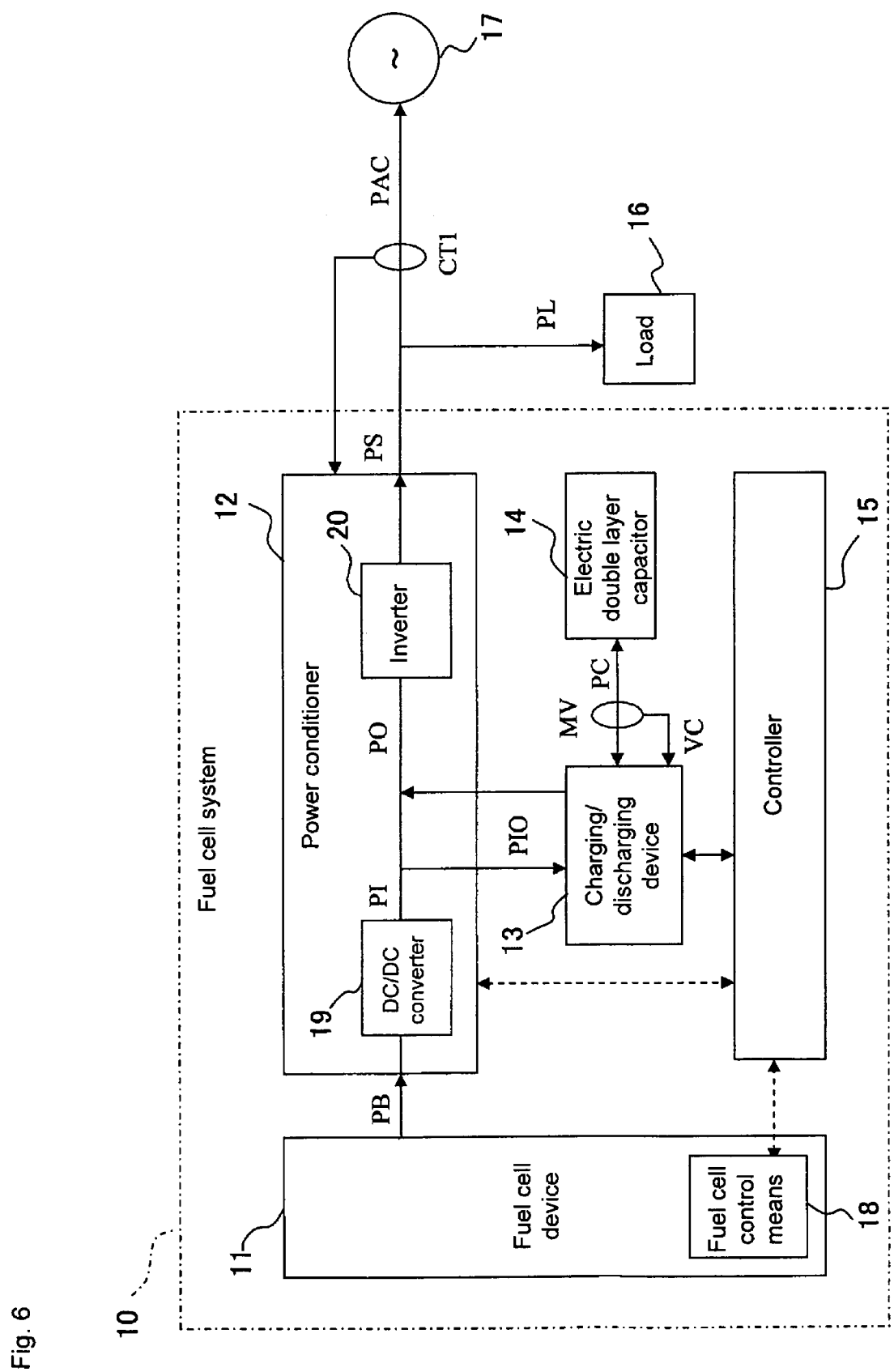
FIG. 6 shows a schematic block diagram of a fuel cell system in accordance with another Embodiment of the present invention.

Here, FIG. 6 shows a schematic block diagram of a fuel cell system 10 in accordance with another Embodiment of the present invention. This system differs from the fuel cell system 10 shown in FIG. 1 only in the fact that the connection end of the input/output power PIO of the charging/discharging device 13 is set between the DC/DC converter 19 of the power conditioner 12 and the inverter 20, and the other structures and the operations thereof are the same as those of the example shown in FIG. 1.

Figure 7:
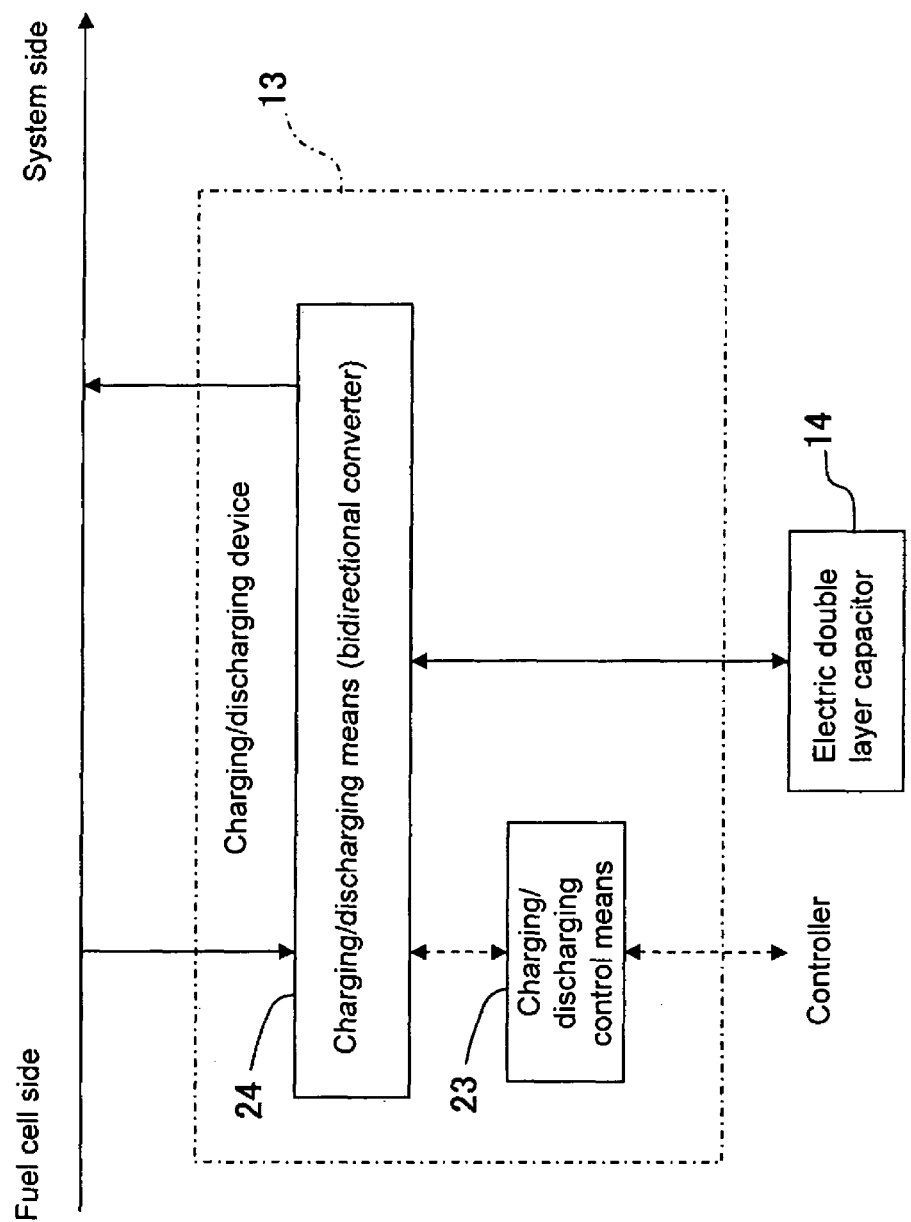
FIG. 7 shows a schematic block diagram of a charging/discharging device in accordance with another Embodiment of the present invention.

Moreover, FIG. 7 shows a schematic block diagram of a charging/discharging device 13 in accordance with another Embodiment of the present invention. In contrast to the charging/discharging device 13 shown in FIG. 2 in which the voltage-lowering and voltage-raising operations are carried out by different converters, the charging/discharging device 13 of FIG. 7 makes it possible to carry out bidirectional operations of the voltage-lowering and voltage-raising by using a single charging/discharging means (bidirectional converter) so that the structure can be simplified.

Figure 8:
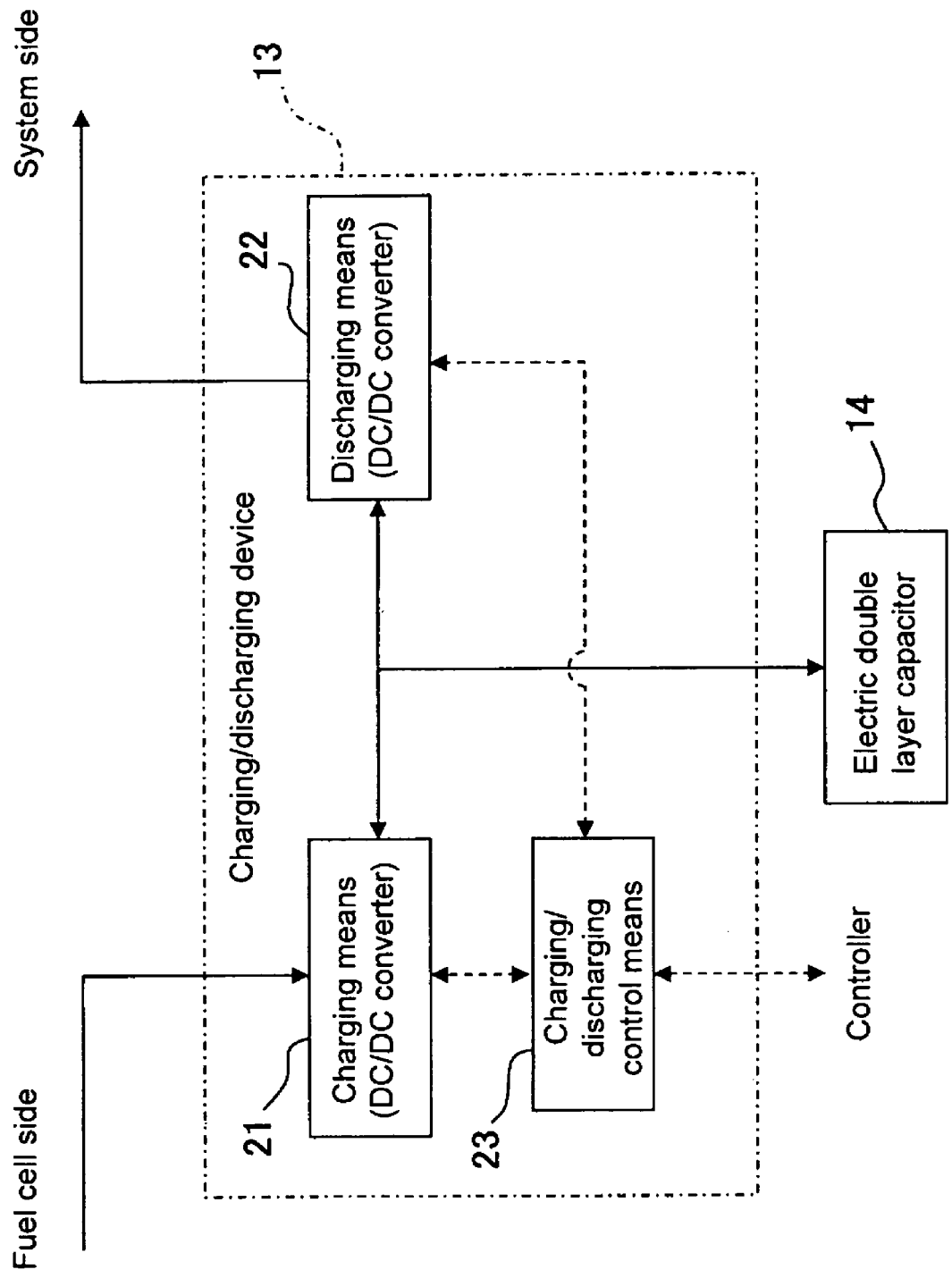
FIG. 8 shows a schematic block diagram of a charging/discharging device in accordance with still another Embodiment of the present invention.

Moreover, FIG. 8 shows a schematic block diagram of a charging/discharging device 13 in accordance with still another Embodiment of the present invention. The charging/discharging device 13 of FIG. 8 has a structure in which individual lines, that is, a line of a charging means 21 (DC/DC converter) connected to the fuel cell side and a line of a discharging means 22 (DC/DC converter) connected to the system side, are prepared.

The present invention is effectively utilized as a household fuel cell system using a fuel cell.

What is claimed is:

1. A fuel cell system comprising:
a fuel cell;
a power conditioner that converts a cell power supplied from the fuel cell to a power corresponding to a load, and outputs the converted power to the load;
a capacitor to which an excessive output power of the fuel cell is charged at the time of a low load operation in which the load of the power conditioner has a lower power consumption than an output power of the fuel cell and from which a power corresponding to the insufficient output power of the fuel cell is discharged at the time of a high load operation in which the load of the power conditioner has a higher power consumption than the output power of the fuel cell;
a voltage detection device for detecting a voltage of the capacitor; and
a control device configured to determine whether the low load operation or the high load operation is being carried out, calculate based upon the power of the capacitor detected by the voltage detection device an output power from the fuel cell so as to be maintained within a range in which the excessive power generated at the time of the low load operation does not exceed a space capacity of the capacitor, and control the output power of the fuel cell so as not to exceed the calculated value, wherein an output power PB of the fuel cell and a voltage VC of the capacitor have a relationship that satisfies the following equation:

$$PB < \sqrt{(T \times C \times (VCmax^2 - VC^2))}$$

where T: load response of the fuel cell, C: capacity of the capacitor, and VCmax: the upper limit value of the capacitor voltage,
wherein the control device is further configured to, at the time of the high load operation, control the output of the power conditioner so as not to allow a discharging voltage of the capacitor detected by the voltage detection device to become a discharging depth or less.

2. The fuel cell system according to claim 1, wherein the control device is further configured to raise the output power of the fuel cell in response to a voltage drop of the capacitor detected by the voltage detection device, and also raise the output of the power conditioner in response to a voltage rise of the capacitor.

3. The fuel cell system according to claim 1, wherein the capacitor is an electric double layer capacitor.

4. The fuel cell system according to claim 3, wherein the control device comprises a memory that stores a table of a voltage range in which the electric double layer capacitor is allowed to charge or discharge in response to an output power of the fuel cell.

* * * * *